A. M. STARKEY.
AUTOMATIC EQUALIZING VALVE.
APPLICATION FILED APR. 18, 1911.
1,053,666.
Patented Feb. 18, 1913.
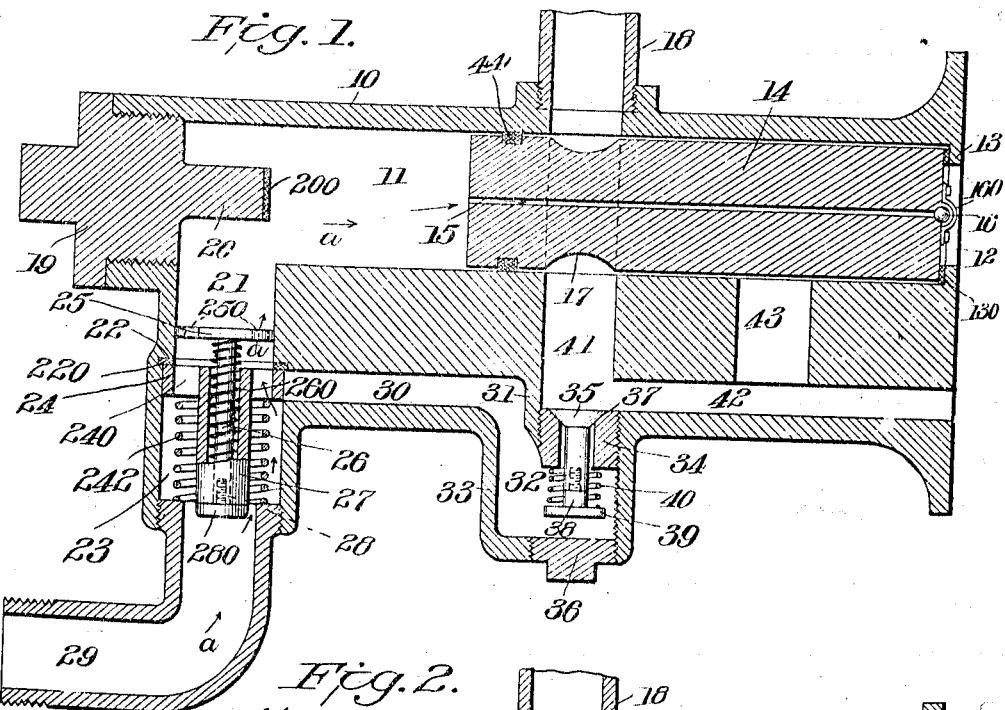
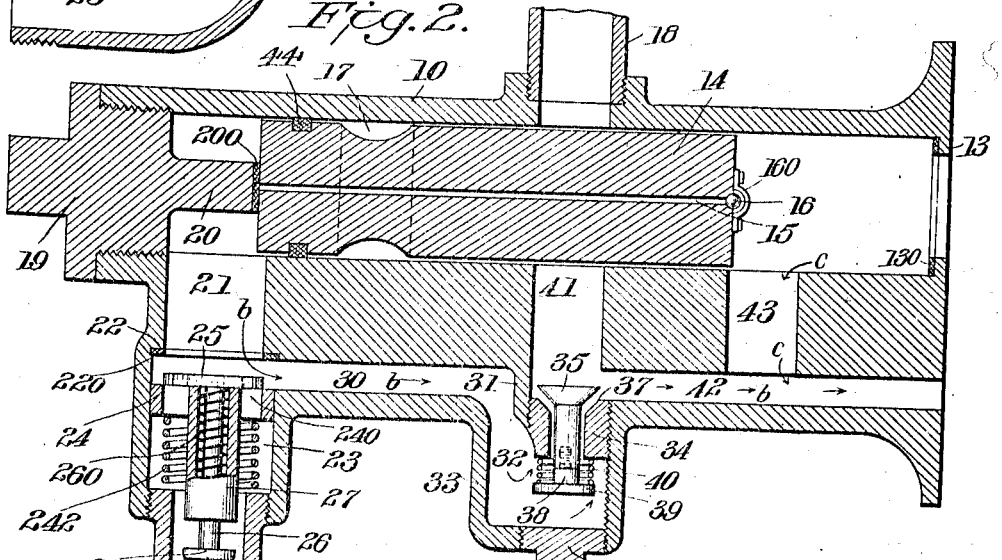
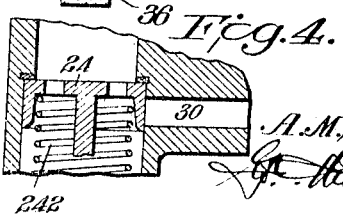
WITNESSES
INVENTOR
A. M. Starkey.
Attorney

UNITED STATES PATENT OFFICE.

ARMSTRONG M. STARKEY, OF McKINNEY, TEXAS.

AUTOMATIC EQUALIZING-VALVE.

1,053,666.

Specification of Letters Patent.

Patented Feb. 18, 1913.

Application filed April 18, 1911. Serial No. 621,946.

*To all whom it may concern:*

Be it known that I, ARMSTRONG M. STARKEY, citizen of the United States, residing at McKinney, in the county of Collin and State of Texas, have invented certain new and useful Improvements in Automatic Equalizing-Valves, of which the following is a specification.

This invention relates to triple valves for air brake systems and has for its object to provide such valves with special improvements to render them more effective and sure in operation in emergency applications.

With this and other objects in view, the invention consists in the improved construction, arrangement and combination of parts hereinafter fully described and afterward specifically claimed.

I have illustrated my invention in the accompanying drawings in which—

Figure 1 represents a longitudinal sectional view of a triple valve equipped with my improvements, the parts being in the positions they assume when the brakes are released. Fig. 2 represents a similar sectional view of the same parts in the positions they assume in emergency applications. Fig. 3 represents a detail view of one of the emergency valves, and Fig. 4 represents a detail view of a modified form of the valve illustrated in Fig. 3.

Like reference numerals mark all of the parts wherever they occur in the various figures of the drawings.

Referring specifically to the drawings, 10 indicates the valve casing which is provided with a large longitudinal cylindrical chamber 11, its open end shown at 12 at the right hand of Figs. 1 and 2 forming a port from the main air reservoir, (not shown) an inwardly projecting annular flange at this port as at 13 forming a seat for the triple valve 14 which snugly fits in the chamber 11 and is movable longitudinally therein under the pressure of air upon its opposite ends as hereinafter explained, the seat 13 being suitably packed as at 130.

The triple valve 14 is provided with a very small passage 15 extending through it centrally from end to end, at the right hand of which is a ball valve 16 held loosely in position by a cage 160, and also with an annular groove 17 in its periphery affording a passage to the outlet 18 from the casing as hereinafter explained.

The left hand of the longitudinal chamber 11 is closed by means of a screw plug 19 having a central extension 20 projecting into the chamber 11 in line with the passage 15 and the center of the triple valve, provided on its inner end with a suitable packing 200.

At the left hand end of the chamber 11, and in free communication therewith, is a downwardly extended chamber 21 which is increased in diameter at a distance from the chamber 11, the annular shoulder 22 at this point forming a valve seat and being provided with a suitable packing 220, the chamber 23 below the valve seat accommodating a circular valve 24 provided with open ports 240 affording communication between chambers 21 and 23, the valve 25 being mounted on the top of a stem 26 slidable in a central opening in valve 24 and normally held raised by a spring 260 coiled around the stem between the two valves. A sleeve 27 depending centrally from valve 24, in register with the central opening affords a longer casing for the stem 26 and insures its proper movement without sticking. A screw 28 threaded into the lower end of the stem 26 is provided with a wide head 280, which when the valve 25 is raised by the spring 260, is seated against the lower end of sleeve 27 and limits the upward movement of said valve.

A pipe 29 is threaded into the lower end of chamber 23, and serving as a port to the train line (not shown) also serves as the lower bearing of a spring 242, which has its upper bearing against the valve 24 and serves to normally hold said valve up against its seat packing 220.

Extending longitudinally through the casing from the chamber 23 is a port or passage 30 which is closed when the valve 24 is seated, as in Fig. 1, which passage is diverted downward by a laterally extending sleeve 31 into a chamber 32 in a lateral extension 33 of the casing, said chamber being constructed to permit of the removal of a valve casing 34 and valve 35 therefrom upon the removal of a screw plug 36. The valve casing 34 is threaded into the sleeve 31 and is provided at its upper end with a seat 37 for the valve 35 which is slidable in said casing. In the lower end of the valve 35 is threaded a plug 38 having a broad head 39 and a spring 40 coiled around the plug and having upper and lower bearings against the valve casing and screw head, serves to normally but yieldingly hold the valve 35 against its seat. The valve 35 affords communication with a transverse port or passage 41 leading to the cylindrical chamber 11, and with a longitudinal port or passage 42 leading to the brake chamber (not shown) said port 42 communicating with the chamber 11 through a transverse port or passage 43.

The triple valve 14 has two movements, viz., to the left from the position of Fig. 1 to that of Fig. 2 and to the right from the position of Fig. 2 to that of Fig. 1, and it performs by virtue of these movements three functions, to wit, charging the auxiliary reservoir to any required air pressure, admitting the air to the brake cylinder in service and emergency applications, and releasing the brakes. When the parts are in the release position of Fig. 1 with the triple valve 14 seated against the seat 13, the valve 24 in its upper position against its seat 22, the valve 25 in its upper position and the valve 35 in its lower position in contact with its seat 37 the course of the air from the train line, indicated by the arrows $a$ is as follows: from port 29 around the stem 26 and sleeve 27 through chamber 23, ports 240 in valve 24, ports 250 in valve 25, chamber 21, chamber 11 and through small central port 15 in the triple valve 14 and out of port 12, the ports 15 permitting the passage of a very small quantity of air and the pressure of the air in the course described against the left hand end of the triple valve 14 forces it tightly against its seat 13, substantially closing the port 12 to the auxiliary reservoir thus gradually recharging that reservoir through port 15, the small size of port requiring about ten seconds to complete this charging. The ball valve 16 is opened by the air passing through port 15 and this valve is of no use at any time except in emergency applications or to prevent leaking of air through port 15 in making applications in order to make the triple valve 14 more effective. The valves 24, 25 and 35 maintain the positions of Fig. 1 during all service applications, the ports 240 and 250 being large enough to permit of a free flow of air to and from the train line for all such applications. In an emergency application, the valve 14 is forced to move. It moves toward the packing 200, and prior to its reaching the packing 200, the valve 25 takes the position shown in Fig. 2. The movement of the valve 14 toward the packing 200, and the consequent positioning of the valve 25 as shown in Fig. 2, is caused by the venting of the air from the chamber 21 to the brake cylinder by way of the passages 30 and 32 and through the passage 42 as indicated by arrows $b$ in Fig. 2. By the time the valve 14 has moved toward the packing 200 to sufficiently cover the outlet 18, the valves 25 and 35 take the positions shown in Fig. 1. Air is then let into the brake cylinder from the auxiliary supply by way of the port 43 and the passage 42. The valve 35 stops all back flow to the train line. The valve 14 is moved from the position shown in Fig. 2 to that shown in Fig. 1 by air from the train line (not shown) passing through the pipe 29 and over the course indicated by arrows $a$, that is, up through chamber 21, lifting the valve 25 from its seat, and passing through the passage 15 of the valve 14 and through the valved port 12 into the auxiliary reservoir thereby gradually recharging the latter, the port 12 being opened by movement of its valve 16 under the pressure of the air, said ball operating to prevent leakage of air through the port 15 in making emergency brake applications.

At 44 I have indicated a packing ring around the triple valve which valve is extremely sensitive to any increase or decrease of air pressure in the train line being thus just as effective in long trains as in short ones.

The valve 35 is provided as a matter of precaution to hold the air pressure in the brake cylinder in cases of emergency where the valve 24 might not be properly seated owing to dust, sand or iron rust accumulated in the train pipe, which, being stirred up in emergency applications, might prevent an air tight seating of said valve. Valve 35 would then prevent the passage of the air.

What is claimed is:—

1. In an air brake system, a triple valve provided with a small longitudinal passage through it open at both ends and provided with a self closing valve actuated by the pressure of air from the auxiliary reservoir, in combination with a projected stem in the chamber of the triple valve in line with said longitudinal passage provided with a suitable packing for closing the train line end of said passage when the triple valve is in emergency position.

2. In an air brake system, a triple valve having a small longitudinal passage through it, open at both ends, in combination with a projected stem in the chamber of the triple valve in line with said longitudinal passage provided with a suitable packing for closing the train line end of said passage when the triple valve is in emergency position.

3. In an air brake system, provided with a chamber communicating at one end with the auxiliary reservoir and at the other end with the train line and having an intermediate escape outlet and with an auxiliary passage leading from the train line to the brake chamber, the combination with the triple valve located in the first named chamber and provided with an annular groove, and an auxiliary valve in the auxiliary passage arranged to permit the passage of air from the train line direct to the brake chamber before the admission thereto of air from the auxiliary reservoir, the groove in the triple valve affording communication between the auxiliary passage and the outlet in release positions.

4. In an air brake system, provided with a main chamber communicating at one end with the auxiliary reservoir and at the other end with the train line and having an intermediate escape outlet, and with an auxiliary passage leading from the train line to the brake chamber and a port leading from the main chamber to the auxiliary passage, the combination with the triple valve located in the main chamber and provided with an annular groove, an auxiliary valve in the auxiliary passage arranged to permit the passage of air from the train line direct to the brake chamber before the admission thereto of air from the auxiliary reservoir, and an extra self-seating valve in the auxiliary passage to prevent escape of air from the brake cylinder when the auxiliary valve fails to properly seat itself, the annular groove in the triple valve affording communication between the auxiliary passage and the outlet in release positions.

In testimony whereof I affix my signature in presence of two witnesses.

ARMSTRONG M. STARKEY.

Witnesses:
T. C. ANDREWS,
SAM NEATHERY.